(12) United States Patent
Ferren et al.

(10) Patent No.: US 11,900,412 B2
(45) Date of Patent: Feb. 13, 2024

(54) AUDIENCE PARTICIPATION APPLICATION, SYSTEM, AND METHOD OF USE

(71) Applicant: Applied Minds, LLC, Burbank, CA (US)

(72) Inventors: Bran Ferren, Beverly Hills, CA (US); Clinton Blake Hope, Los Angeles, CA (US); Julian David Brooks, Philadelphia, PA (US)

(73) Assignee: Applied Minds, LLC, Burbank, CA (US)

( * ) Notice: Subject to any disclaimer, the term of this patent is extended or adjusted under 35 U.S.C. 154(b) by 0 days.

(21) Appl. No.: 17/211,765

(22) Filed: Mar. 24, 2021

(65) Prior Publication Data

US 2021/0304246 A1 Sep. 30, 2021

Related U.S. Application Data

(60) Provisional application No. 62/994,718, filed on Mar. 25, 2020.

(51) Int. Cl.
*G06Q 30/02* (2023.01)
*G06Q 30/0242* (2023.01)
*G06Q 30/0241* (2023.01)

(52) U.S. Cl.
CPC ..... *G06Q 30/0246* (2013.01); *G06Q 30/0277* (2013.01)

(58) Field of Classification Search
CPC .......... G06Q 30/0246; G06Q 30/0277
See application file for complete search history.

(56) References Cited

U.S. PATENT DOCUMENTS

| 10,255,898 B1* | 4/2019 | Movshovitz-Attias ..... G11B 27/031 |
| 10,300,394 B1* | 5/2019 | Evans ..... A63F 13/86 |
| 11,082,789 B1* | 8/2021 | Mimilakis ..... G06F 3/165 |
| 2014/0007147 A1* | 1/2014 | Anderson ..... H04N 21/6582 725/9 |
| 2014/0133683 A1* | 5/2014 | Robinson ..... G10L 19/008 381/303 |
| 2015/0113551 A1* | 4/2015 | Hicks ..... H04N 21/44218 700/90 |

(Continued)

OTHER PUBLICATIONS

I. N. Schaafsma and A. Nahapetian, "Synchronized audio capture with an array of mobile devices," 2017 14th IEEE Annual Consumer Communications & Networking Conference (CCNC), Las Vegas, NV, USA, 2017, pp. 331-336, doi: 10.1109/CCNC.2017.7983128. (Year: 2017).*

(Continued)

*Primary Examiner* — Eric R Netzloff
(74) *Attorney, Agent, or Firm* — Perkins Coie LLP; Michael A. Glenn

(57) ABSTRACT

Techniques herein provide an audience participation software application, system and method construction that enables remote and present users of the audience participation software application, system, and method to produce an accumulated output device effect wherein, components of the output device effect may be shared between the users, stored for further use, and/or used to control outputs of one or more communicatively coupled output device systems located and operated at one or more live entertainment events.

1 Claim, 4 Drawing Sheets

(56) References Cited

U.S. PATENT DOCUMENTS

| | | | | |
|---|---|---|---|---|
| 2015/0142454 A1* | 5/2015 | Ojanpera | ............... | G11B 20/20 |
| | | | | 704/500 |
| 2017/0097992 A1* | 4/2017 | Vouin | ................... | G06F 16/686 |
| 2019/0230436 A1* | 7/2019 | Tsingos | ................. | H04R 1/406 |
| 2020/0359108 A1* | 11/2020 | Lee | ....................... | H04H 60/66 |

OTHER PUBLICATIONS

"Low Bit Rate Digital Coding of Audio", J. M. Eargle, Handbook of Recording Engineering; Basic Masking Phenomena; pp. 290-291; 1996.

Mahdi, Omar Adil, et al., "Implementing a Novel Approach an Convert Audio Compression to Text Coding via Hybrid Technique", IJCSI International Journal of Computer Science Issues, vol. 9, Issue 6, No. 3, Nov. 2012; ISSN (Online): 1694-0814; www.IJCSI.org.

* cited by examiner

AUDIENCE PARTICIPATION APPLICATION, SYSTEM, AND METHOD OF USE

CROSS-REFERENCE TO RELATED APPLICATION

This application claims the benefit of U.S. Provisional Patent Application No. 62/994,718 titled "Audience Participation Application, System, and Method of Use, filed Mar. 25, 2020, which is incorporated by reference herein in its entirety.

FIELD OF THE INVENTION

One or more embodiments of the disclosed innovation generally relates to software applications, systems, and methods of use. More particularly, certain embodiments of the innovation relate to interactive software applications, systems, and methods of use thereof, which enable one or more application users to distribute personal content.

DESCRIPTION OF THE RELATED ART

The following background information may present examples of specific aspects of the prior art (e.g., without limitation, approaches, facts, or common wisdom) that, while expected to be helpful to further educate the reader as to additional aspects of the prior art, is not to be construed as limiting the present innovation, or any embodiments thereof, to anything stated or implied therein or inferred thereupon.

It can be appreciated that interactive mobile device applications have been in use for years. Typically, conventional interactive applications may comprise electronic board and card games, computer games, dating websites, messaging applications, and media content sharing applications. The following is an example of a specific aspect of the prior art that, while expected to be helpful to further educate the reader as to additional aspects of the prior art, is not to be construed as limiting the present innovation, or any embodiments thereof, to anything stated or implied therein or inferred thereupon. It is contemplated that with conventional interactive mobile device applications, individuals may provide text or gesture responses in response to remotely communicated prompts or queries from other users or a game server. Again, by way of educational background, another aspect of the prior art generally useful to be aware of is that with another conventional interactive mobile device application, application user audience members may provide trivia answers in response to prompts displayed within an entertainment venue. The responses may be shared amongst other users and also used by the application controller to generate advertisements and promotional responses to the users.

SUMMARY OF THE INVENTION

It is contemplated that with the conventional prior art, a mobile device application user is not able to participate in interactions with other users while also participating in interactions with entertainers, performers, audience members, and/or orators at one or more venues. In view of the foregoing disadvantages inherent in the known types of interactive software applications as they appear in the prior art, the audience participation software application, system, and methods of use thereof, according to the present innovation, substantially departs from the conventional concepts and designs of the prior art, and in so doing provides embodiments of the present innovation that enable remote and present users of the audience participation software application, system, and methods to produce an accumulated output device effect which may be seen, heard, and/or felt by entertainers, performers, orators, and other audience members at live venues as well as other application users wherein, components of the accumulated output device effect may be shared between the users, stored for further use, and/or used to control outputs of one or more communicatively coupled output device systems. That is, embodiments of the innovation relate to a system, method, and program product that provide a fun, engaging, and motivating platform for remote and live users to be involved with the emotional states and activities of human entertainers, performers, audience members, and/or orators performing live at one or more venues.

The present innovation provides a new interactive software application, system and method construction that is utilized for enabling remote and present users of the interactive audience software application, system, and methods to produce an accumulated output device effect wherein, components of the output device effect may be shared between the users, stored for further use, and/or used to control outputs of one or more communicatively coupled output device systems located and operated at one or more live entertainment events.

One primary object of the present innovation is to provide an audience participation application, an audience participation application system, and methods of using said aforementioned application and system that increases interaction between audience members and performers as well as overcome the shortcomings of the prior art devices.

Another object of the present innovation is to provide an audience participation application, system, and methods of use that enable remote and present users of the audience software application, system, and methods to produce an accumulated output device effect wherein, components of the output device effect may be shared between the users, stored for further use, and/or used to control outputs of one or more communicatively coupled output device systems located and operated at one or more live entertainment events.

Another object of the present innovation is to provide an audience participation application, system, and methods of use that users can utilize while being located remotely from a live entertainment venue.

Another object of the present innovation is to provide an audience participation application, system, and methods of use that assist users in effecting the emotional states and activities of human entertainers, performers, audience members, and/or orators performing live at one or more venues.

Another object of the present innovation is to provide an audience participation application, system, and methods of use that assist users in partaking in a fun, engaging, and motivating platform while at remote and live locations.

Another object of the present innovation is to provide an audience participation application, system, and methods of use that assist users in creating an accumulated output device effect which may be shared between the users, stored for further use, and/or used to control outputs of one or more communicatively coupled output device systems.

Another object of the present innovation is to provide an audience participation application, system, and methods of use that allows remote users to produce an accumulated output device effect which may be seen, heard, and/or felt by entertainers, performers, orators, and other audience members at live venues.

Another object of the present innovation is to provide an audience participation application, system, and methods of use that enables users to personalize content that may be shared with entertainers, performers, orators, and audience members at live venues.

Other objects and advantages of the present innovation will become obvious to the reader and it is intended that these objects and advantages are within the scope of the present innovation.

To the accomplishment of the above and related objects, this innovation may be embodied in the form illustrated in the accompanying drawings, attention being called to the fact, however, that the drawings are illustrative only, and that changes may be made in the specific construction illustrated.

BRIEF DESCRIPTION OF THE DRAWINGS

Various other objects, features and attendant advantages of the present innovation will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
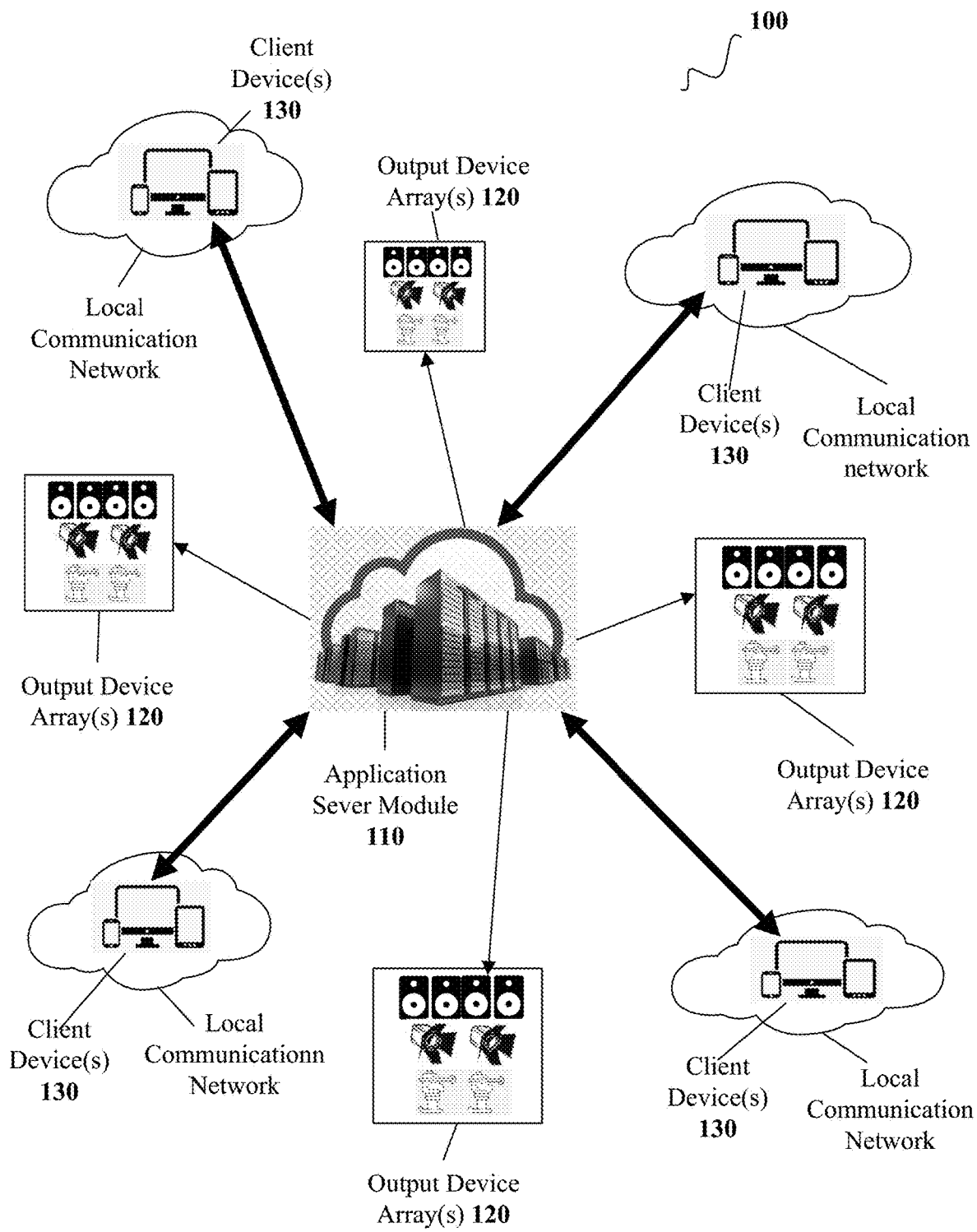
FIG. 1 illustrates an exemplary system architecture of an audience participation system embodiment, in accordance with embodiments of the present innovation.

There has thus been outlined, rather broadly, the more important features of the innovation in order that the detailed description thereof may be better understood, and in order that the present contribution to the art may be better appreciated. There are additional features of the innovation that will be described hereinafter.

In this respect, before explaining at least one embodiment of the innovation in detail, it is to be understood that the innovation is not limited in its application to the details of construction and to the arrangements of the components set forth in the following description or illustrated in the drawings. The innovation is capable of other embodiments and of being practiced and carried out in various ways. Also, it is to be understood that the phraseology and terminology employed herein are for the purpose of the description and should not be regarded as limiting.

Terminology. The following paragraphs provide definitions and/or context for terms found in this disclosure (including any appended claims):

"Comprising." This term is open-ended. As used in any appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

It is contemplated that it will be obvious to those skilled how to create a multiplicity of alternate embodiments of the present innovation that simply consisting essentially of a certain functional combination of elements of any described embodiment(s) to the exclusion of any others not set forth therein, and the innovation thus covers all such exclusive embodiments as if they were each described herein.

With respect to the terms "comprising," "consisting of," and "consisting essentially of," where one of these three terms is used herein, the presently disclosed and claimed subject matter may include the use of either of the other two terms. Thus, in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Furthermore, devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present innovation.

As is well known to those skilled in the art, many careful considerations and compromises typically must be made when designing for the optimal manufacture of a commercial implementation of any system, and in particular, the embodiments of the present innovation. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and any appended claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; a smart television, servers, application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage unit devices.

"Software" may refer to prescribed rules or instruction to operate a computer as implemented/executed by one or more processors of the computer. Examples of software may include: code segments in one or more computer-readable languages; graphical and or/textual instructions; applets; pre-compiled code; interpreted code; compiled code; and computer programs.

The general purpose of the present innovation, which will now be described subsequently in greater detail, is to provide a new interactive software application, system and method of use, that has many of the advantages of the audience participation software application, system, and methods of use mentioned heretofore and many novel features that result in a new interactive application which is not anticipated, rendered obvious, suggested, or even implied by any of the prior art interactive software applications, either alone or in any combination thereof.

To attain this, and with reference to FIG. 1, an audience participation system architecture 100 generally comprises one or more application host servers or server nodes configured to operate under a cloud computing architecture, a specialized networking of dedicated servers such as, and without limitation, a server-network configuration wherein, a plurality of server nodes may be interconnected, and combinations thereof (referred to collectively as an application server module 110), which is operably coupled to one or more output device arrays 120, and further communicatively coupled to audience participation software program applications, executed on one or more client devices 130. The audience participation system is designed for information to be communicated between the plurality of client devices, the application server module, and the one or more output device arrays via several types of communication network configurations. The communication network configuration that couples the client devices and the application server module may be, for example and without limitation, a wheel configuration such that each of the plurality of client device communicates bidirectionally with the application server module via two-way communication protocols. Moreover, the communication network configuration that couples the application server module and the one or more output device arrays may be, for example and without limitation, controller/peripheral(s) configurations such that the application server module, operating as a controller, communicates with and instructs each of the one or more output device arrays, operating as peripheral devices, via control system communication protocols.

In many embodiments, the communication network configuration between the application server module and the one or more output device arrays may implement an adaptive multicasting, wherein the application server module may communicate aggregated data to peripheral devices (i.e., one or more output device arrays) according to a switching technique operating within the application server module, based on user input selections. The switching technique governs the communication of control data and output device content data based on accumulated (i.e., aggregated) input data from one or more users. In particular, the switching technique is configured to determine with which output devices, of the output device arrays, communication is to occur. That is, the switching technique may receive user input and determine subgrouping organizations of output devices that are to receive aggregated data.

In many embodiments of the present innovation, the application server module comprises a distributed server-network configuration wherein, each server node may comprise distinct venue data which details output device control information, for a given venue that is associated with a given server node. Since output device array configurations may vary between venues, a server node associated (i.e., communicatively, and operably coupled) with a particular venue's output device arrays will execute control attributes based on the configuration and availability of the output device arrays located at the associated venue. Furthermore, as will be described further below, each server node may aggregate user input to create accumulated output device content data which, in conjunction with venue data, allows a given server module to operate one or more output device arrays, at an associated venue, in accordance with an accumulation of user input. This accumulation provides a compressed message data form that is communicated to an output device array from one or more associated server nodes wherein, the compressed message data contains output device content data and further allows the one or more sever nodes to determine a communication distribution type.

As will now be described, embodiments of the present innovation provide means and methods of providing a plurality of users an audience participation software application and further facilitating execution of the audience participation software application on client devices of the users.

Figure 2:
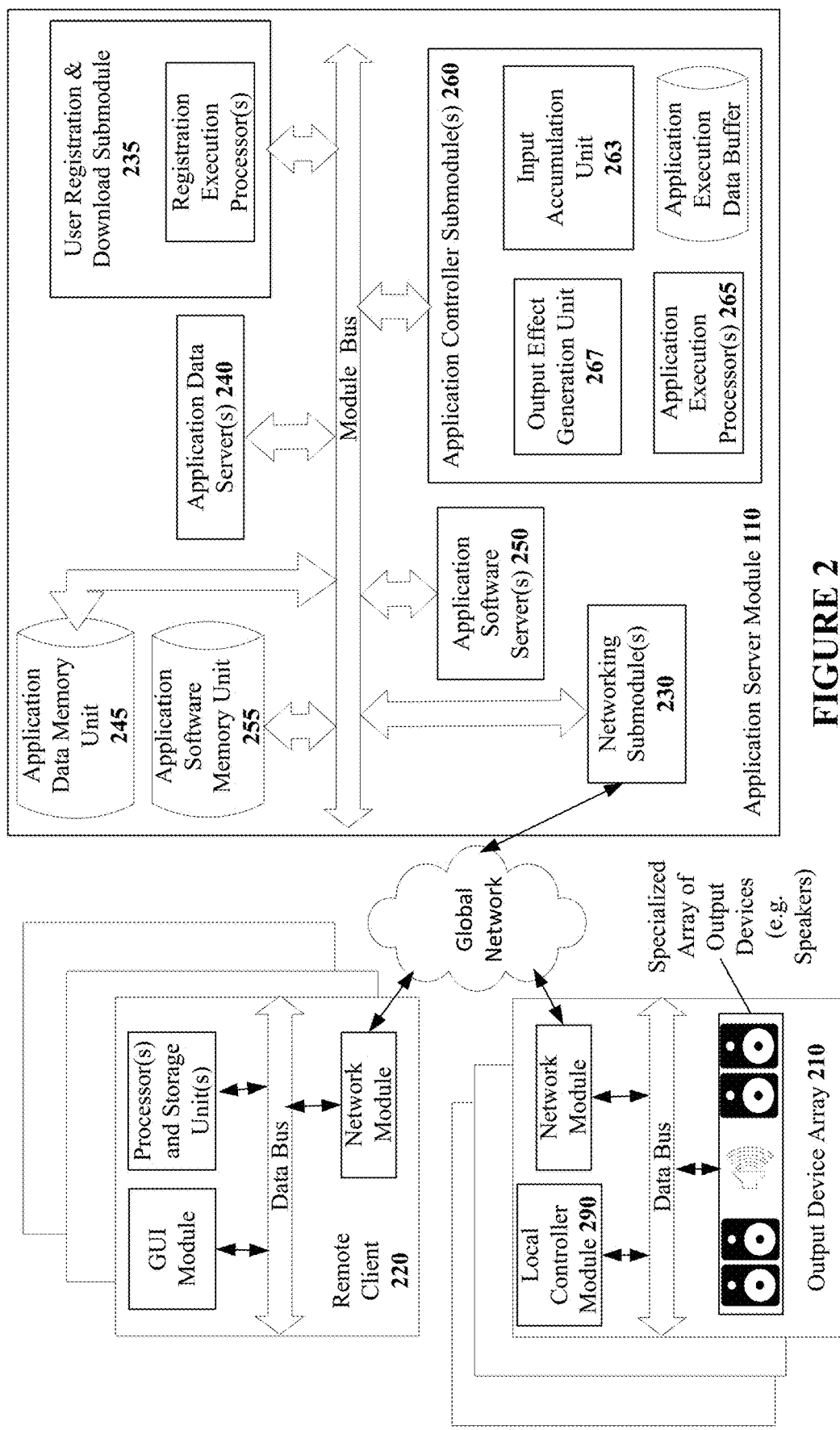
FIG. 2 illustrates an exemplary software module architecture of an audience participation system embodiment, in accordance with embodiments of the present innovation.

With reference to FIG. 2, the audience participation system is implemented via a software module architecture 200 which comprises an application server module 110, as described above, in operable communication with a multiplicity of output device arrays, sampled here as output device array 210, and further in communication with a multiplicity of client devices, sampled here as client device 220. The application server module further comprises one or more networking communication submodule(s) 230, an audience participation application user registration and download submodule 235, one or more audience participation application data server(s) 240, one or more audience participation application data memory unit(s) 245, one or more audience participation application software server(s) 250, one or more audience participation application software memory unit(s) 255, one or more audience participation application controller submodule(s) 260, and a module system bus, which performs functions of a data bus, address bus, and control bus at the application server module. The application controller submodule(s) 260 further comprises an input accumulation unit 263, application execution processors 265, and an output effect generation unit 267. In the present embodiment, each of the remote client devices includes a GUI module, processors, storage, and a network module coupled via a bidirectional data bus, wherein data may be sent between the modules and the processors of a client device for processing, storage, and internal/external communication. Furthermore, each output device array includes a local controller module 290, an array of output devices, and a network module coupled via a bidirectional data bus configured to allow control signal data and device content data to be communicated to one or more output devices of the array via the network module and local controller module 290. In many embodiments of the present innovation, the local controller module 290 is configured according to an adaptive channel control architecture wherein, in response to received control signal data from the application server module, the local controller module may initiate, change, and/or terminate channel output addresses and/or content data delivery to one or more output devices of an associated output device array in accordance with output techniques of the present innovation as described herein. The networking modules and networking submodule(s) 230 may operate to execute computer-readable instructions to access a global network and communicate bidirectional with each other. In the present embodiment, all of the modules and submodules of the architecture may execute computer-readable instructions to perform different method steps in accordance with many embodiments of the present innovation. In some alternative embodiments, the bi-directional data bus may be implemented by the internet, a wireless transmission of data, or by other local communication network protocols and techniques.

Figure 3:
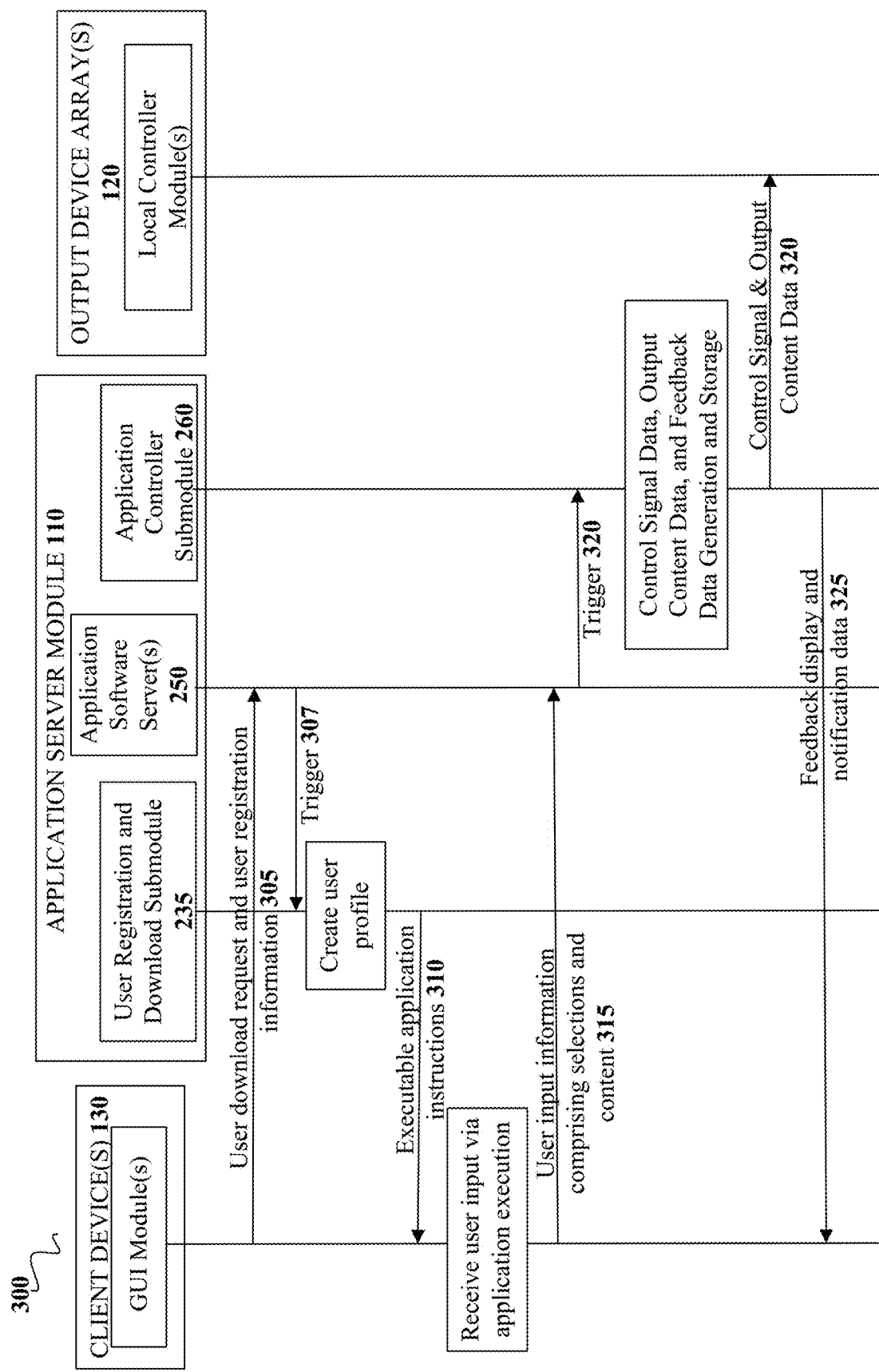
FIG. 3 illustrates an exemplary software communication module diagram of an audience participation system embodiment, in accordance with embodiments of the present innovation.

With further reference to FIG. 3, illustrated is an exemplary software communication module diagram 300, in accordance with one or more embodiments of the present innovation, wherein the one or more audience participation application software memory units 255 embody processor readable, and processor executable, software instructions which when read and executed by the one or more audience participation application software servers 250 may cause, the application software servers to trigger, at step 307, the user registration and download submodule 235 to create a user profile and download, at a step 310, a set of processor readable and processor executable software instructions to client devices in response to receiving, at step 305, a download request from the client devices. The set of downloadable software instructions comprise audience participation software application instructions, which when downloaded to, read by, and executed by processors of the client devices 130, facilitates features of the audience participation software application as carried out by the client devices executing the downloaded software instructions via one or more client device processors.

Referring back to the application server module 110, as the client devices execute (i.e. run) the downloaded software instructions, and user application input is communicated to the application server module 110, the application software servers 250, operating in accordance with the processor readable, and processor executable, software instructions embodied on the application software memory unit 255, receive the user application input, from one or more clients at a step 315. The application software servers 250 then trigger, at a step 317, one or more audience participation execution processors 265 of the application controller submodule 260 to facilitate features of the audience participation software application as carried out at the application server module 110. Features of the audience participation software application execution, as executed at the application server module, by the application execution processors 265, in accordance with the processor readable and processor executable software instructions embodied on the one or more audience participation application software memory units, include but are not limited to, receiving user input information, forwarded by the application software server 250 at the step 317 and using the input information to generate output device control signal(s), output device content data, and feedback information, wherein each is based on an accumulation of the user input information. The control signal(s) and device output content data are communicated to the one or more output device arrays 120, at a step 320 while feedback information may be communicated back to the one or more client devices at a step 325.

Figure 4:
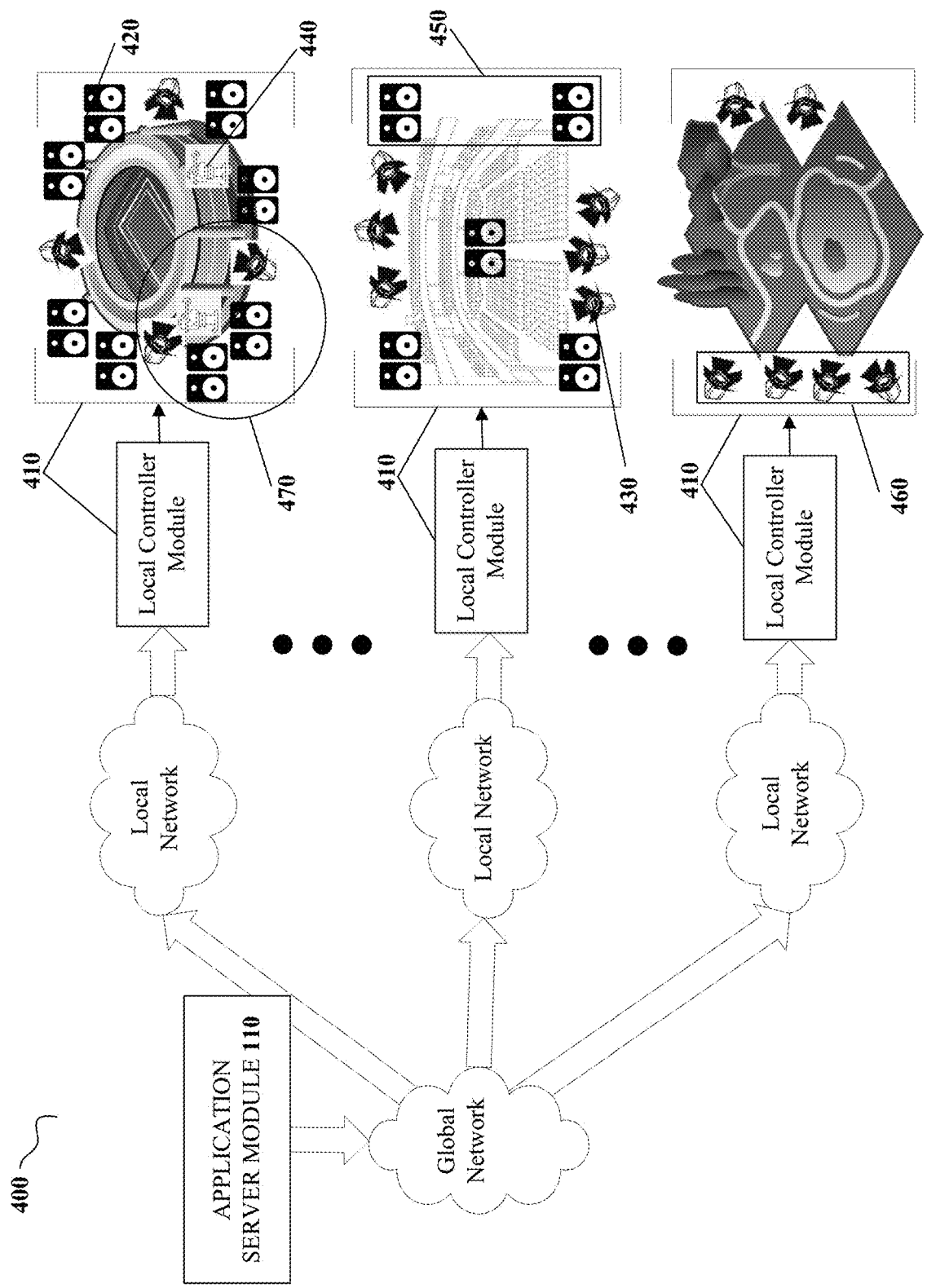
FIG. 4 illustrates an exemplary system configuration of an audience participation system in accordance with an embodiment of the present innovation.

With further reference to FIG. 4, illustrated is an exemplary audience participation system configuration 400 in accordance with an embodiment of the present innovation. In the present embodiment, the audience participation system comprises a plurality of output device arrays 410 operably coupled to the application server module via one or more global and/or local communication networks wherein, the audience participation application execution processors of the application server module may further execute audience participation software application instructions to generate and communicate control signals and output device content data to the one or more output devices, via the local controller modules associated with each array. The one or more output device arrays further comprise an array of audio output devices 420, lighting devices 430, vibration devices 440, or combinations thereof, configured to respond to the control signals and device output content. Furthermore, the output device arrays may be associated with one or more local communication networks and one or more entertainment venues, such as and without limitation, sports arenas, concert halls, stadiums, town halls, conference rooms, auditoriums, parks, playgrounds, malls, courts, chambers, speedways, race tracks, beaches, halls, convention centers, and other public and private venues, indoor and outdoor, suitable for hosting live performances by entertainers, performers, audience members, and/or orators, wherein an output device array configuration may comprise, for example, and without limitation, output devices positioned within, around, and/or outside of an entertainment venue. As described above, and further below, the adaptive multicasting of the present innovation provides that in some executing instances of embodiments of the present innovation, output devices of an output device array are operated collectively with respect to other output devices of the output device array such that each output device of the output device array receives a same control signal and device output content from the application server module. That is, in this collective operation mode, as determined by the switching technique, an output device array may be controlled as a whole by the application server module. The adaptive multicasting of the present innovation further provides that in some executing instances of embodiments of the present innovation, output devices of an output device array are operated distributively with respect to other output devices of the output device array such that each output device of the output device array may receive separate and distinct control signals as well as separate and distinct device output content from the application server module. That is, in this distributive operation mode, as determined by the switching technique, an output device array may be communicated with and controlled distributively by the application server module. Furthermore, the adaptive multicasting of the present innovation also provides that in some executing instances of embodiments of the present innovation, output devices of an output device array are operated sectionally with respect to other output devices of the output device array. In this mode of sectional operation, as determined by the switching technique, an output device array is interpreted to comprise a plurality of subsections, exemplary samples are illustrated in FIG. 4 as subsection 450, subsection 460, and subsection 470, wherein each output device array subsection is further composed of a number of output devices. Preferably, the number of output devices that constitute a subsection may be greater than one and less than all of the output devices available from the output device array, such that the output device array has two or more subsections. Furthermore, in the mode of sectional operation, each output device of a given output device array subsection may be operated collectively with respect to the other output devices of the given output device array subsection, as similarly described above. In addition, each output device array subsection, of a given output device array, may be operated distributively with respect to the other output device array subsections of the given output device array. In yet other embodiments of the present innovation, output devices of the one or more output device arrays may be operated according to a combination of the above-described operation modes such that the application server module may control some output devices as collective subsections and also control some output devices distributively (i.e. individually) within a subsection wherein other devices are under collective control. In many embodiments of the present innovation, the determination of operation modes and combinations thereof, as described above, are implemented by the application server module operating according to an adaptive multicasting address switching technique to dynamically adjust output device channel addresses in response to the received user input and user selections, in real-time.

In many embodiments of the present innovation, the audience participation system comprises the audience participation software application implemented on a plurality of client devices. The implementation may be performed via an internet browser in communication with the application server module or via the downloaded audience participation software application instructions on a users' client device which when executed by processors of the users' client device causes the processors to display an interactive, input accepting, audience participation application GUI (Graphical User Interface), wherein the audience participation application GUI is also in communication with the application server module. In many embodiments of the present innovation, the client devices may comprise mobile devices and/or computing devices, such as and without limitation, a desktop personal computer (PC), laptop, workstation, personal digital assistance device (PDA), tablet, mobile phone, smart tv, or other devices capable of interfacing via an internet, cellular, and/or Bluetooth™ communication protocol. Furthermore, many embodiments of the present innovation comprise reading and executing audience participation application computer software. In some of these embodiments, the software may be integrated into hardware, including, without limitation, uniquely designed hardware for running embodiment software. In any embodiment, the audience participation software application, may be accessed by an internet browser or by an application program interface (API) operating with a mobile device or computing device and may cause, via the GUI, the devices to facilitate the receiving of user input, wherein the user input may be, for example and without limitation, a selection of preregistered possible outputs, live audio recordings of the user, a selection of an audio cancelation request, a vibration intensity, a vibration cancellation request, and a selection of output destinations.

It is noted that method steps of the audience participation software application as implemented on the client devices may be performed via the internet browser in communication with the application server module or via the downloaded audience participation software application instructions on users' client devices, which when executed by processors of the users' client device causes the processors to display the audience participation application GUI. In the present embodiment, via the GUI, the user input may be received at a plurality of client devices in use by a plurality of users running the audience participation software application on their respective client devices. The audience participation software application may then facilitate the communication of the users' input to the application server module. Furthermore, the application server module may receive the communicated input and accumulate components of the users' input to generate output device content data wherein, the output device content data comprises accumulated user input data that is output to selected devices of output device arrays and causes the devices to output an effect depending on the types of input received. Various types of output device content data will now be described in conjunction with user selections.

In many embodiments of the present innovation, via the internet browser or by executing the audience participation software application, on a client device provides an audience participation application graphical user interface (GUI) with selectable buttons, wherein a user of the client device may submit desired input via selecting desired buttons. In some embodiments of the present innovation, the GUI is configured to display interactive buttons that indicate and are associated with selectable preregistered possible outputs, wherein the user may interact with one or more of the desired buttons, via curser, speech recognition, gesture recognition, gaze detection, or other detectable input means that may be received to indicate selection of the one or more desired buttons, which causes the audience participation software application to record that a desired button selection has been received at the client device, and further causes the audience participation software application to trigger, via communication to the application server module, an actuation of one or more output devices to output the selected preregistered possible output. It is noted that one type of output device content data includes the selectable preregistered possible outputs, which may comprise a plurality of different types of outputs. One type of selectable preregistered possible output may comprise pre-recorded and/or computer-generated audio output. Non-limiting examples of this type of selectable output include, pre-recorded and/or computer generated cheers, jeers, chants, applaud, boos, profanities, random noise, instrument noise, team specific chants, users' stored recordings, user typed messages, and/or phrases such as, but not limited to "GOOOO", "GOOOOAL", "YEAH", "YES", "NO", "ENCORE", "YOU SUCK REF", "AWWW", "DAMN", "LET'S GO", "WE LOVE YOU" etc. and substantially any other type of audio that may be computer-generated and/or pre-recorded, and further which may allow the user to express themselves audibly. Another type of selectable preregistered possible output may comprise selectable preprogrammed lighting effects, wherein upon receiving a selection of a selectable preprogrammed lighting effect, the application server module may trigger one or more output lighting devices to operate in accordance with the selected preprogrammed lighting effect. Non-limiting examples of selectable preprogrammed lighting effects, which may be received at the application server module, include increasing brightness, decreasing brightness, strobing/flashing, increasing strobing/flashing rate, decreasing strobing/flashing rate, projecting or changing a selectable color, establishing or changing a lighting direction, establishing or changing a projected light pattern, and/or any combination thereof, wherein the application server module may then operate one or more lighting devices to perform the described action of the selected preprogrammed lighting effect. Still yet another type of selectable preregistered possible output may comprise selectable preprogrammed vibration effects, wherein upon receiving a selection of a selectable preprogrammed vibration effect, the application server module may trigger one or more output vibration devices to operate in accordance with the selected preprogrammed vibration effect. Non-limiting examples of selectable preprogrammed vibration effects include simulations of rumbling, stomping, and impulse shakes.

It is further noted that method steps of the audience participation software application as implemented on the client devices may be performed via the internet browser or via the audience participation application GUI, wherein the application server module may receive communicated user input and generate an accumulated output device effect depending on the type of input received. Additional types of input that may be accumulated by the application server module as output device content data include dynamic inputs, which further include, but are not limited to, live audio recordings, decibel levels, selections of an audio cancelation request, vibration intensity levels, vibration cancellation request, and a selection of output destinations. In most embodiments of the present innovation, the GUI is configured to display interactive buttons and/or sliders that indicate and are associated with the dynamic inputs, wherein the user may interact with one or more of the desired buttons and/or sliders, via curser gesture selection, or other interaction by a user as exemplified above, of the one or more desired buttons and/or sliders, which causes the audience participation software application to record that a desired button selection and/or desired slider position has been received at the client device, and further causes the audience participation module, via the input accumulation unit 263 and output effect generation unit 267, to generate an accumulated output device effect based on, a count of dynamic inputs, an intensity or level of dynamic inputs, and an output destination. In the present embodiment, the generated accumulated output device effect is determined at the application server module, for each output destination selected by the users, wherein the determination comprises generating an output device content data message to trigger an actuation of the one or more output devices to output the generated accumulated output effect.

Many embodiments of the present innovation comprise receiving live audio recordings at the client devices via the audience participation application GUI. The GUI may comprise an interactive "record" button that may be triggered via curser, gesture, or other interaction by a user as noted above, wherein a microphone device of a client device records audio data including decibel levels while the record button is triggered. The GUI may further comprise a sliding window illustrating the user's decibel levels with respect to time. In the present embodiment, the audience participation software application logs that a recording is being submitted and forwards the log, recording, and the audio data of the recording to the application server module, wherein the audio data comprises the decibel level at each instant of time during the recording. In some embodiments, the audio data and recording may be stored, shared with other users, and/or later used as a selectable preregister possible output as discussed above. In many embodiments the recording and audio data are used by the audience participation module to generate output device content data which is communicated to selected output device arrays to trigger an accumulated output device effect at the selected arrays. Thus, GUI may further comprise selectable indications of output destinations, wherein the output destinations may be a singular output device of an output device array, a subsection of an output device array, or an entire output device array. The audience participation software application further communicates the received output destination selection to the application server module, wherein an output device content data message that triggers a generated accumulated output device effect is determined based on the recording, audio data and, selection of output destination. For example, in instances wherein a single audio output device is the selected destination, the application server module triggers the selected audio output device to play the user audio recording at the same decibel level as recorded during input, which is communicated in the audio data. By way of another example, in instances wherein an output device array subsection or an entire output device array are the selected destination, the application server module generates an accumulated output effect by scaling the decibel level of a recording, as recorded during input, by the number of audio output devices within the output device array subsection (when a subsection is chosen for output) or by the number of audio output devices within the output device array (when an entire array is chosen for output). That is, the application server module is programmed to receive audio recordings of users over a predetermined recording duration time "t-duration" and further receive each user's selection of a number and location of output devices that each audio recording will be outputted to as destinations. The application server module is further configured to compute an average or maximum decibel level achieved by the user, during an initial recording time "t-initial" of the duration time, for each of the audio recordings wherein, the initial recording time is predetermined to be an initial fraction of the predetermined duration time. For example, and without limitation, a t-duration may be 3 seconds wherein a corresponding t-initial may be the initial 750 ms. It is contemplated that in this manner, for each user recording, a data set which represents the recording may be reduce by compressing the varying decibel levels of the audio recording to a constant/singular value which is calculated from decibel levels recorded at a sub-portion time period of the entire recording length. Therefore, as the application server module generates output device content data messages corresponding to one or more audio recordings, the size of a message may be reduced by communicating the recording data with a singular decibel level as opposed to varying decibel levels which would require more data to represent.

In many embodiments the application server module begins to generate output device effects by generating an accumulated compressed output device content data message which triggers the output device effect by determining, for each input audio recording over an associated t-duration time period, an average or maximum decibel level over a respectively associated t-initial time period. Then, for each recording, the application server module receives a respective selection of output devices where users desire to have the output delivered. Next, acting on each user individually but simultaneously, and based on each user's audio input and selection of output device(s), the application server module respectively scales the determined decibel levels, calculated during the initial (t-initial) recording times, by the number of audio output devices selected to be triggered for the particular recording. The audience participation application then begins to generate output device content data by creating an output device content data message to be communicated to one or more selected output devices for triggering wherein, the message comprises at least, an audio frequency data representation of the recorded audio input, the scaled decibel levels at which the audio is to be replayed/recreated, and controller instruction for operating the devices to create/produce the audio frequency data at the scaled decibel level at each of the selected output devices. By way of illustrative example, in an exemplary use case of a single user choosing to have five output devices triggered for the delivery and broadcasting of output device content, the application software module will generate an output device content message that will be multicast communicated to each of the five output device wherein, the output device content message would comprise the time varying frequency data representation of the input audio recording and the scaled decibel level at which the recording will be outputted. Continuing with the present example, the scaled decibel level, generated at the application server module is ⅕ the average or maximum decibel level measured during the t-initial recording period. This generated message then instructs each selected output device to trigger an output device effect by outputting (i.e., audibly broadcasting) the entire t-duration length frequency representation of the input audio recording at ⅕ of the average or maximum decibel level, as measured during t-initial. In other words, an exemplary 3 second audio recording (audio clip wherein t-duration equals 3 seconds) with a 500 ms t-initial period, in which the average decibel level during the t-initial period is 125 dB, given the above exemplary use case, the application server module may generate an output device content message comprising the frequency data representation for the 3 second clip and an output decibel level of 25 dB wherein, the message is communicated to each of the 5 output devices which in turn, triggers each device respectively to produce an output device effect of audibly broadcasting the 3 second audio clip at 25 dB. Since multiple users may distinctly record audio inputs but select common and differing output devices to be triggered within a similar time window, the present innovation provides, as described above and in further detail below in the next processing steps, that the output device content data message may comprise an accumulation (i.e. aggregation) of scaled user audio data to be communicated to each output device, from a plurality of users that have selected common output devices. Again, the application server module may represent each input audio recording as a time varying frequency data set with a corresponding scaled decibel level defined by the total number of selected output devices. By way of another illustrative example, in an exemplary use case of multiple users (sampled here for simplicity to be three users) wherein, a first user selects an entire array for output (e.g. devices A through J), a second user selects a subsection of the entire array for output (e.g. devices D through G), and a third user selects a single device for output (e.g. device F), the application software module may generate several output device content messages that will be multicast communicated to each of the output device. As an interjection, it is noted that from one execution instance to another, the server nodes may adaptively multicast communicate generated output device content messages based on received user selections of output devices which may vary across execution instances. Continuing with the present example, each user may record a 4 second audio input clip, wherein a sub-portion (t-initial) period may be predetermined as 1 second. Moreover, the application server module may determine that the maximum dB recorded for the first, second, and third users are 95 db, 115 dB, and 110 dB, respectively.

Breaking from the example, in many embodiments of the present innovation, the application server module may determine, based on user input, a communication configuration for communicating to the selected devices. Furthermore, the application server module may identify all output devices which will require triggering based on the users' selections, and for each output device, identify whether the device is a commonly selected device or as a solitary selected device, wherein a commonly selected device is a device selected by two or more users during an executing instance and a solitary selected device is a device selected by just one user during an executing instance. The identification of commonly selected and solitarily selected output devices may be determined from a selection counter which tracks, for each output device, selection flags over a predetermined time window or execution instance, by compiling a binary dataset (Fs) that spans the total number of users (U) during an execution instance. The selection counter may be embodied as processor readable and executable instructions in the venue data of server nodes associated with the output device arrays of associated venues. In the present embodiment, the application server module generates a portion of the output device content data by accumulating the frequency representation of input audio clips that are to be outputted to each device respectively, wherein the accumulation may comprise overlapping the individually recorded audio frequency representations by aligning the audio frequency representations, for a selected output device, with respect to time. The overlapped frequency representation may be understood as a single noisier audio clip. Furthermore, the application server module generates another portion of the output device content data by determining an accumulated scaled decibel level at which to output the overlapped audio frequency representation, wherein the accumulated decibel level comprises a summation of scaled averages (or scaled maximums) based on each users' contribution to an output device array. In many embodiments of the present innovation, the accumulation and overlap generation processing steps may be executed by input accumulation unit 263, wherein, the input accumulation unit may initialize and utilize a summation formulation that sums the product ratio $((\max dB_{(i)}/N_{(i)}) \times Fs_{(i)})$ from i=1 to i=U for each output device, where Max dB is a compiled dataset, compiled by the application server module, indicating the maximum sub-portion decibel level recorded by the input accumulation unit for each user's audio input respectively, N is a compiled dataset, compiled by the application server module, indicating the total number of output devices each user has selected respectively for output of the input audio clip, and subscript "i" is an indices value that points to the Max dB, N, and Fs dataset values compiled for each user per execution instance. In many embodiments of the present innovation, an execution instance, as alluded to above, defines a period of which the audience participation application system may receive user input for the generation and broadcasting of accumulated and solo output device effects. This period may be dynamic across execution instances, and predefined as suitable for the needs of a particular application, such that in one exemplary instance the period may be 3 seconds and in another exemplary instance the period may be 5 seconds. With respect to the summation formulation of the input accumulation unit, the summation formulation is reinitialized with, and operates on, new data set values as users provide new input audio recordings and make new output device selections. Thus, at each execution instance the application server module generates user decibel level data sets, user total device selection count data sets, and the selection counter generates new count tracks for each device.

Referring back to the three-user use case example, and with respect to the above description of the accumulation provided by embodiments of the present innovation. The application server module would generate a max dB dataset spanning [95 115 110]. Additionally, in accordance with the above exemplary user selections of output devices, the application server module would generate an N dataset spanning [10 4 1]. Furthermore, Fs is defined for each of device A through J such that devices A, B, C, H, I, and J are associated with Fs datasets spanning [1 0 0], devices D, E, and G are associated with Fs data sets spanning [1 1 0], and device F is associated with a dataset spanning [1 1 1]. In continued accordance with the present example and described processing of the application server module, discussion of output devices A, D, and F summations illustrate the operation of the application server module for determining decibel level for a given output device's content data. With respect to device A, the summation can be determined as $[((95/10) \times 1)+((115/4) \times 0)+((110/1) \times 0)]$ which equates to an accumulated scaled decibel level of 9.5 dB for device A. With respect to device D, the summation can be determined as $[((95/10) \times 1)+((115/4) \times 1)+((110/1) \times 0)]$ which equates to an accumulated scaled decibel level of 38.25 dB for device D. Furthermore, with respect to device F, the summation can be determined as $[((95/10) \times 1)+((115/4) \times 1)+((110/1) \times 1)]$ which equates to an accumulated scaled decibel level of 148.25 dB for device F.

In many embodiments of the present invention output device content data may comprise an overlapped audio frequency representation and an accumulated scaled decibel level, wherein a corresponding output device content data message comprising the output device content data may trigger the corresponding device, to which the message it communicated, to output the overlapped audio frequency representation at the accumulate scaled decibel level.

To facilitate message communication, and as introduced above, the audience participation application system implements an adaptive multicast switching technique to group output devices with identical output device content data and communicates generated compressed output device content data messages in a multicast manner based on matching accumulated scaled decibel levels and matching user contributors between output devices during a shared execution instance.

Many embodiments of the present innovation further comprise receiving selections of audio cancellation request at the client devices via the audience participation application GUI. The GUI may comprise an interactive "cheer cancel" button that may be triggered via curser, gesture, or other interaction by a user as exemplified above, wherein the audience participation software application logs that an audio cancellation request has been received at the client device. As noted above, the GUI may further comprise selectable indications of output destinations, wherein the output destinations may be a singular output device of an output device array, a subsection of an output device array, or an entire output device array. The audience participation software application further communicates a received output destination selection to the application server module, wherein a generated accumulated output device effect is determined at the application server module based on the selection of output destination, indication of cheer/audio cancellation request, and a total number of audio outputs being output at the selected output destination. In many embodiments, the application server module generates an accumulated output device audio effect by summing the number of total cancellation request designating an output destination and removing a same number of input recordings designating a same output destination. In some cases, the removed input recordings are randomly selected, wherein the total number of removed recordings are equal to the number of cancellation request. In some cases, the removed input recordings are the highest decibel level recordings, wherein the number of highest decibel level recordings removed are equal to the number of cancelation request. In some other cases the application server module may remove alternating highest and lowest recordings, wherein the total number of removed recordings are equal to the number of cancellation request. That is, the application server module generates an accumulated output audio effect, and thus output device content data, by deleting or reducing a number of input recordings and/or input decibel levels, wherein the number of deleted recordings and/or decibel levels is equal to a number of received cancellation request. In some embodiments of the present innovation, the application server module generates output device content data for one or more output devices by receiving a cancellation request at a time t, receiving an output destination selection for the cancellation request, receiving one or more input audio recordings, receiving output destination request(s) for the one or more input audio recordings, scaling the decibel level of the one or more input audio recordings respectively according to a number of output devices for each recording, determining matching output destination locations/addresses between the cancellation request output destination and the audio recording output destination request, comparing time windows/execution instances of the one or more scaled and matched recordings with a matched cancellation request with input time t that is within an execution instance, and removing/deleting a destination matched recording that has a time window that overlaps with the received cancellation input time. In some other embodiments of the present innovation, and with reference to the embodiment above, the application server module may receive a cancellation request and a predetermined window of time for the cancellation to be in effect, wherein through a similar method as noted above, the application server module may remove a recording and/or parts of recordings with overlapping time windows and matching output destinations.

Similar to the above-described audio output generation, many embodiments of the present innovation comprise receiving selections of vibration intensity at the client devices via the audience participation application GUI. The GUI may comprise an interactive "shake" slider rule that may be triggered via curser or gesture interaction by a user. As noted above, the GUI may further comprise selectable indications of output destinations, wherein the output destinations may be a singular output device of an output device array, a subsection of an output device array, or an entire output device array. The audience participation software application further communicates the received output destination selection to the application server module, wherein a generated accumulated output device effect is determined at the application server module using the received vibration intensity and selection of output destination. In instances wherein a single vibration output device is the selected destination, the application server module triggers the selected vibration output device to output vibrations at the same intensity level as recorded during input, which is communicated in the input data. In instances wherein an output device array subsection or an entire output device array are the selected destination, the application server module generates an accumulated output effect by scaling the vibration intensity level, as recorded during input, by the number of vibration output devices within the output device array subsection (when a subsection is chosen for output) or by the number of vibration output devices within the output device array (when an entire array is chosen for output). That is, the application server module generates an accumulated output device vibration effect by scaling an input vibration intensity level by the number of vibration output devices to be triggered for the vibration output, wherein the output for the selected output destination comprises a sum of the scaled vibration intensities.

Many embodiments of the present innovation also comprise receiving selections of vibration cancellation request at the client devices via the audience participation application GUI. The GUI may comprise an interactive "shake cancel" button that may be triggered via curser or gesture interaction by a user, wherein the audience participation software application logs that a shake cancellation request has been received at the client device at time t. As noted above, the GUI may further comprise selectable indications of output destinations, wherein the output destinations may be a singular output device of an output device array, a subsection of an output device array, or an entire output device array. The audience participation software application further communicates a received output destination selection to the application server module, wherein a generated accumulated output device effect is determined at the application server module based on the selection of output destination, indication of vibration/shake cancellation request, and a total number of vibration outputs being output at the selected output destination. In many embodiments, the application server module generates an accumulated output device vibration effect by summing the number of total vibration cancellation request designating an output destination and removing a same number of input vibration intensities designating a same output destination at a same time $t_{[TJ(1)}$ or within a predetermined plus or minus range of time t. In some embodiments, the removed input vibrations are randomly selected, wherein the total number of removed vibrations are equal to the number of cancellation request. In some cases, the removed input vibrations are the highest intensity level vibrations, wherein the number of highest intensity level vibrations removed are equal to the number of cancellation request. In some other embodiments the application server module may remove alternating highest and lowest intensity level vibrations, wherein the total number of removed vibration intensities are equal to the number of vibration cancellation request That is, the application server module generates an accumulated output vibration effect by deleting or zeroing a number of input vibration intensity levels, wherein the number of deleted vibration intensity levels is equal to a number of received cancellation request.

The foregoing is considered as illustrative only of the principles of the innovation. Further, since numerous modifications and changes will readily occur to those skilled in the art, it is not desired to limit the innovation to the exact construction and operation shown and described, and accordingly, all suitable modifications and equivalents may be resorted to, falling within the scope of the innovation.

Those skilled in the art will readily recognize, in light of and in accordance with the teachings of the present innovation, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the innovation may be embodied.

Embodiments within the scope of the present disclosure may also include tangible and/or non-transitory computer-readable storage media for carrying or having computer/processor executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

The example embodiments described herein can be implemented in an operating environment comprising computer/processor executable instructions (e.g., software) installed on a computer or computing device, in hardware, or in a combination of software and hardware. The computer/processor executable instructions can be written in a computer programming language or can be embodied in firmware logic. When written in a programming language conforming to a recognized standard, such instructions are be executed on a variety of hardware platforms and for interfaces to a variety of operating systems. Although not limited thereto, computer software program code for carrying out operations for aspects of the present innovation are written in combinations of suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Python, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present innovation are also written in combinations of one or more programming languages, including an object oriented programming language such as Java, Smalltalk, C++, Python, or the like and conventional procedural programming languages, such as the "C" programming language or similar programming languages. The program code may execute entirely on the user's computing device or partly on the user's computing device, as a stand-alone software package, partly on the user's computing device and partly on a remote computing device or entirely on the remote computing device or server. In the latter scenario, the remote computing device may be connected to the user's computing device through any type of network, including a local area network (LAN) or a wide area network (WAN), or the connection may be made to an external computing device (for example, through the Internet using an Internet Service Provider).

Those skilled in the art will readily recognize, in light of and in accordance with the teachings of the present innovation, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the innovation may be embodied.

What is claimed is:

1. A processor implemented system comprising:
a plurality of audio data recording;
one or more output device arrays;
one or more processors, communicatively coupled to the plurality of audio data recording devices and operably coupled to the one or more output device arrays, the processors executing processor readable instructions, embodied on a computer readable medium, which causes the one or more processors to:
receive a plurality of audio recordings, audio recording data, and output device selection data from the plurality of audio data recording devices,
generate time-varying frequency representations of each of the received audio recordings,
generate a count dataset from the output device selection data,
receive a recording duration time that corresponds to an entire recording length of an audio recording and determine an initial recording time from the recording duration time,
generate an output decibel level using the determined initial recording time, the audio data from a plurality of the audio data recording devices, and the count dataset,
generate output data by overlapping the generated time-varying frequency representations of the audio recordings with respect to time,
actuate the one or more output device arrays to broadcast the generated output data at the generated output decibel level.

* * * * *